(12) United States Patent
Deleye et al.

(10) Patent No.: US 12,552,923 B2
(45) Date of Patent: Feb. 17, 2026

(54) PROCESS FOR PRODUCING VINYL AROMATIC (CO)POLYMER INCORPORATING POST-CONSUMER AND/OR POST-INDUSTRIAL RECYCLED POLYSTYRENE

(71) Applicant: TotalEnergies OneTech Belgium, Seneffe (BE)

(72) Inventors: Jean-Claude Deleye, Herne (BE); Magali Vachaudez, Neufmaison (BE); Armelle Sigwald, Nivelles (BE); Elodie Perche, Brussels (BE); Gabriela Quevedo Silvetti, Nivelles (BE)

(73) Assignee: TotalEnergies OneTech Belgium, Seneffe (BE)

( * ) Notice: Subject to any disclaimer, the term of this patent is extended or adjusted under 35 U.S.C. 154(b) by 1021 days.

(21) Appl. No.: 17/640,161

(22) PCT Filed: Aug. 12, 2020

(86) PCT No.: PCT/EP2020/072579
§ 371 (c)(1),
(2) Date: Mar. 3, 2022

(87) PCT Pub. No.: WO2021/043545
PCT Pub. Date: Mar. 11, 2021

(65) Prior Publication Data
US 2022/0315749 A1    Oct. 6, 2022

(30) Foreign Application Priority Data

Sep. 4, 2019   (EP) .................................... 19195472

(51) Int. Cl.
*C08J 9/14*   (2006.01)
*C08J 9/00*   (2006.01)
(Continued)

(52) U.S. Cl.
CPC ............. *C08L 25/06* (2013.01); *C08J 9/0061* (2013.01); *C08J 9/0066* (2013.01); *C08J 9/122* (2013.01); *C08J 9/127* (2013.01); *C08J 9/149* (2013.01); *C08J 2201/03* (2013.01); *C08J 2203/06* (2013.01); *C08J 2203/12* (2013.01);
(Continued)

(58) Field of Classification Search
CPC ..... C08F 112/08; C08F 257/02; C08J 9/0061; C08J 9/0066; C08J 9/122; C08J 9/127; C08J 9/141; C08J 9/142; C08J 9/149; C08J 2201/03; C08J 2203/06; C08J 2203/12; C08J 2203/14; C08J 2203/202; C08J 2325/06; C08J 2453/00; C08K 3/04; C08K 3/22; C08K 3/26; C08K 5/0066; C08K 5/02; C08K 2201/003; C08L 25/06; C08L 2205/025; C08L 53/02
See application file for complete search history.

(56) References Cited

U.S. PATENT DOCUMENTS

| | | |
|---|---|---|
| 8,609,778 B1 | 12/2013 | Frost et al. |
| 9,096,698 B2 | 8/2015 | Frost et al. |
| 2015/0344658 A1 | 12/2015 | Masahito et al. |

FOREIGN PATENT DOCUMENTS

| | | |
|---|---|---|
| DE | 4319180 A1 | 1/1994 |
| EP | 2379628 B2 | 8/2013 |

(Continued)

OTHER PUBLICATIONS

PCT/EP2020/072579 International Search Report and Written Opinion dated Oct. 27, 2020 (9 p.).

*Primary Examiner* — John M Cooney
(74) *Attorney, Agent, or Firm* — Kolitch Romano Dascenzo Gates LLP

(57) ABSTRACT

The present invention is related to a process for the production of a vinyl aromatic (co)polymer comprising the steps of:
a) mixing
  a fraction (A) comprising one or more monomers selected from the group consisting of styrene, alpha-methyl styrene, acrylonitrile, methyl (meth)acrylate, (meth)acrylic acid and butadiene with
  a fraction (B) comprising post-consumer recycled vinyl aromatic (co)polymer,
  wherein the weight ratio of fraction (B) to fraction (A) is comprised between 0.01/1 and 1/1, preferably between 0.05/1 and 0.5/1
b) subjecting the resulting mixture to a free-radical polymerization and polymerizing to a monomer conversion up to 90%, to obtain a polymerized mixture comprising vinyl aromatic (co)polymer;
c) vacuum devolatizing the polymerized mixture and recovering vinyl aromatic (co)polymer characterized by a weight average molecular weight comprised between 100,000 and 400,000 g/mol;
wherein one or more bromine derivative capture agents are added before, and/or during and/or after at least one of the steps a) to c); and
wherein 100 parts of one or more bromine derivative capture agents comprises at least 50 parts by weight of hydrotalcite of the formula:

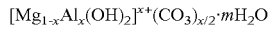

$[Mg_{1-x}Al_x(OH)_2]^{x+}(CO_3)_{x/2} \cdot mH_2O$ wherein:
0<x≤0.5, and m is a positive number.

The present invention is also related to expandable and extruded expanded vinyl aromatic (co)polymer compositions obtained from vinyl aromatic (co)polymers comprising post-consumer and/or post-industrial vinyl aromatic (co) polymer and to a process for the production of said expandable and extruded expanded vinyl aromatic (co)polymer compositions.

6 Claims, No Drawings

(51) Int. Cl.
*C08J 9/12* (2006.01)
*C08L 25/06* (2006.01)

(52) U.S. Cl.
CPC ...... *C08J 2203/14* (2013.01); *C08J 2203/202* (2013.01); *C08J 2325/06* (2013.01); *C08J 2453/00* (2013.01); *C08L 2205/025* (2013.01)

(56) References Cited

FOREIGN PATENT DOCUMENTS

| | | | |
|---|---|---|---|
| EP | 2921520 A1 | 9/2015 | |
| EP | 2957413 A1 | 12/2015 | |
| EP | 2998347 B2 | 6/2018 | |
| EP | 3301134 B2 | 2/2019 | |
| WO | WO-9407950 A1 * | 4/1994 | ............... C08K 3/26 |
| WO | 2008/021417 A2 | 2/2008 | |
| WO | 2008/021418 A1 | 2/2008 | |
| WO | 2009/134628 A1 | 11/2009 | |
| WO | WO-2010080285 A2 * | 7/2010 | ............. C08L 25/06 |
| WO | 2010/114637 A1 | 10/2010 | |
| WO | 2018/158285 A1 | 9/2018 | |

* cited by examiner

PROCESS FOR PRODUCING VINYL AROMATIC (CO)POLYMER INCORPORATING POST-CONSUMER AND/OR POST-INDUSTRIAL RECYCLED POLYSTYRENE

CROSS-REFERENCE TO RELATED APPLICATIONS

This application claims the benefit of PCT/EP2020/072579 filed Aug. 12, 2020, which claims priority from EP19195472.6 filed Sep. 4, 2019, which is incorporated herein by reference in its entirety for all purposes.

FIELD OF THE INVENTION

The present invention relates to a process for the production of vinyl aromatic polymers comprising post-consumer and post-industrial recycled polystyrene, to flame retarded expandable (EPS) and extruded (XPS) polystyrene, obtained from said vinyl aromatic polymers, to the process for producing said flame retarded EPS and XPS and to the foams produced therefrom.

STATE OF THE ART

As technologies for producing polymeric materials from simple molecular building blocks (i.e. monomers) have advanced, the products of such techniques, such as plastic goods, have become increasingly prevalent in society.

Polystyrene is a widely used plastic in many aspects of human life and in industries due to its useful characteristics of low cost, light weight, ease of manufacture, versatility, thermal efficiency, durability, and moisture resistance.

On the other hand, polystyrene is very stable and extremely hard to degrade in the environment after disposal. Therefore, post-consumer polystyrene is currently mostly incinerated.

However, for environmental reasons, it would be advantageous if at least a portion of the polystyrene-based products could be recycled. One general source of polystyrene that could potentially be recycled can be obtained from articles used by consumers, also known as post-consumer recycled (PCR-PS) material and/or from customer returns and production waste, not suitable for being used in the consumer market, also known post-industrial recycled (PIR-PS) material. Unfortunately, a number of variables affect the feasibility of using post-consumer and post-industrial material as a recycled material source for polystyrene Besides the presence of insoluble material such as particulates, non styrenic polymers, food wastes, metal etc., as is generally the case for PCR-PS, the processing history of the recycled polystyrene material influences the final properties of polystyrene comprising post-consumer recycled polystyrene (PCR-PS) and/or post-industrial recycled polystyrene (PIR-PS). Blending of recycled and virgin polystyrene results in poor properties of the blend produced.

To overcome these problems, it has been proposed to dissolve the recycled polystyrene within styrenic monomer, filtering the resulting mixture and to polymerize the resulting purified mixture.

U.S. Pat. No. 8,609,778 discloses a styrenic resin comprising at least approximately 20 weight percent PCR-PS, wherein the styrenic resin has a melt flow rate (MFR) of less than approximately 2.5 g/10 min per ASTM D-1238-10 and an Mz+1 ($\Sigma N_i \cdot M_i^4 / N_i \cdot M_i^3$) of at least approximately 685,000. The styrenic resin is produced by a free radical polymerization process performed on a feed having PCR-PS dissolved in monovinylarene monomer. The insoluble material associated with the PCR-PS feed is removed in a continuous mode by a filtering system comprising a self-cleaning filter.

U.S. Pat. No. 9,096,698 discloses a styrenic resin incorporating PCR-PS and systems and methods for making the same. The styrenic resin comprises between 1 weight percent and 9 weight percent PCR-PS, has a melt flow rate (MFR) of less than approximately 2.0 g/10 min per ASTM D-1238-10, and an Mz+1 molecular weight ($\Sigma N_i \cdot M_i^4 / N_i \cdot M_i^3$) of at least 700,000. The styrenic resin is produced by a free-radical polymerization process performed on a feed having PCR-PS dissolved in monovinylarene monomer. The feed is produced in such a way so as to continuously remove contaminants commonly associated with PCR-PS.

DE 4319180 discloses a process for recycling used polystyrene articles comprising:
  dissolving the polystyrene in styrene monomer;
  purifying the solution;
  optionally adding polybutadiene or styrene butadiene block copolymer etc.;
  polymerizing in a conventional polymerization system and
  removing residual solvent.

WO 2018/158285 discloses a process to produce a vinyl aromatic polymer comprising PCR-PS wherein the process comprises the steps of:
  a) providing the PCR-PS and monovinyl aromatic monomer to at least a dissolver;
  b) mixing the PCR-PS and the monovinyl aromatic monomer within the dissolver to dissolve the PCR-PS in the monovinyl aromatic monomer so as to produce a polymerization mixture, wherein the polymerization mixture comprises insoluble material originated from the dissolved PCR-PS;
  c) filtering the polymerization mixture in a filtration system in order to obtain a stream of filtered polymerization mixture;
  d) ending the filtering of the polymerization mixture and recovering the filtered polymerization mixture;
wherein the step c) includes continuously redirecting at least a part of the stream of the filtered polymerization mixture, exiting the filtration system, back to the dissolver and mixing it with the polymerization mixture, so as to continuously reduce the content of insoluble material in the polymerization mixture contained in the dissolver.
The process further comprises the additional step of forming a reaction mixture from the filtered polymerization mixture with the addition of free radical initiator and subjecting the reaction mixture to a free polymerization in one or more polymerization reactors.

Despite the significant advantage of the state of the art processes, the possible negative effect of particular components/additives, associated with polystyrene-based products, on the polymerization step is not discussed.

As such the presence of brominated flame retardants and flame retardant synergists in PCR-PS and PIR-PS, such as is the case for expanded polystyrene, represents a significant hindrance for recycling in the polystyrene production process.

On the one hand there is the safety, health and environmental risk (HBr emission and reaction run away) and the occurrence of corrosion in the production equipment, on the other hand there is the depolymerization/degradation/discoloration phenomenon at temperatures higher than 200° C., caused by these additives.

Accordingly, a need exists for a method for producing a high quality stream of polystyrene, obtained from the polymerization of monovinyl aromatic monomer comprising PCR-PS and/or PIR-PS, said PCR-PS and PIR-PS comprising brominated flame retardant and flame retardant synergist.

Aims of the Invention

The present invention aims to provide a process for the production of vinyl aromatic polymers obtained from polymerizing vinyl aromatic monomers in the presence of post-consumer recycled polystyrene (PCR-PS) and/or post-industrial recycled polystyrene (PIR-PS), said recycled polystyrene (PCR/PIR-PS) comprising brominated flame retardants and flame retardant synergists, said vinyl aromatic polymers having characteristics identical to the vinyl aromatic polymer obtained from polymerizing vinyl aromatic monomers in the complete absence of PCR/PIR-PS, said vinyl aromatic polymers allowing the production of expandable and extruded expanded vinyl aromatic polymers for the preparation of molded parts, such as insulation panels.

SUMMARY OF THE INVENTION

The present invention discloses a process for the production of a vinyl aromatic (co)polymer comprising the steps of:
a) mixing
  a fraction (A) comprising one or more monomers selected from the group consisting of styrene, alpha-methyl styrene, acrylonitrile, methyl (meth)acrylate, (meth)acrylic acid and butadiene with
  a fraction (B) comprising recycled vinyl aromatic (co)polymer,
  wherein the weight ratio of fraction (B) to fraction (A) is comprised between 0.01/1 and 1/1, preferably between 0.05/1 and 0.5/1;
b) subjecting the resulting mixture to a free-radical polymerization, and polymerizing to a monomer conversion of up to 90%, to obtain a polymerized mixture comprising vinyl aromatic (co)polymer;
c) vacuum devolatizing the polymerized mixture and recovering vinyl aromatic (co)polymer characterized by a weight average molecular weight comprised between 100,000 and 400,000 g/mol;
wherein one or more bromine derivative capture agents are added before and/or during and/or after at least one of the steps a) to c); and
wherein 100 parts of one or more bromine derivative capture agents comprises at least 50 parts by weight of hydrotalcite of the formula:

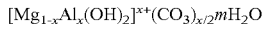

wherein:
0<x≤0.5, and m is a positive number.

Preferred embodiments of the present invention disclose one or more of the following features:
  the process comprises the additional step of filtering the mixture of step a) over a filter with a mesh size comprised between 10 and 1000, before initiating step b);
  fraction (B) comprises bromine containing flame retardant and flame retardant synergists;
  fraction (B) comprises between 100 and 40,000 ppm of bromine;
  one or more bromine derivative capture agents are added before the devolatizing step c);
  the bromine derivative capture agent is selected from the group consisting of the metal salts of longer chain carboxylic acids, layered double hydroxides, metal oxides, metal hydroxides, metal carbonates, metal lactates, the metal salts of a phosphoric or phosphonic acid and mixtures thereof;
  the one or more bromine derivative capture agents are added in such an amount that the weight ratio of bromine derivative capture agent over bromine of the bromine containing flame retardant of fraction (B) is 4 or less;
  the recycled vinyl aromatic (co)polymer of fraction (B) is characterized by a weight average molecular weight comprised between 100,000 and 400,000 g/mol;
  the polymerization in step b) is performed in a continuous multi reactor process, starting at a temperature comprised between 115° C. and 150° C. and stepwise increasing to a temperature comprised between 145° C. and 190° C.;
  vacuum devolatilizing of step c) is performed at a temperature comprised between 210° C. and 255° C. and a pressure comprised between 1 and 50 mbar·abs.

The present invention further discloses an extrusion molded or injection molded vinyl aromatic (co)polymer composition comprising vinyl aromatic (co)polymers obtained from the polymerization of vinyl aromatic monomers in the presence of recycled vinyl aromatic (co)polymer.

The present invention additionally discloses expandable or extruded expanded vinyl aromatic (co)polymer compositions comprising:
  from 2 to 10 parts by weight, preferably from 3 to 7 parts by weight of blowing agent;
  from 0.2 to 5 parts by weight, preferably from 0.3 to 4 parts by weight, more preferably from 0.4 to 3 parts by weight of a halogenated flame retardant; and
  from 0.02 to 5 parts by weight, preferably from 0.025 to 4 parts by weight of one or more bromine derivative capture agents;
per 100 parts of vinyl aromatic polymer,
  said vinyl aromatic (co)polymer being obtained from the polymerization of vinyl aromatic monomers in the presence of recycled vinyl aromatic (co)polymer
  said vinyl aromatic (co)polymer being characterized by a weight average molecular weight comprised between 150,000 and 250,000 g/mol.

Preferred embodiments of the expandable or extruded expanded vinyl aromatic compositions disclose one or more of the following features:
  the expandable or extruded expanded vinyl aromatic (co)polymer composition comprises from 0.5 to 15, preferably from 1 to 10 parts by weight of dispersed athermanous particles selected from the group consisting of coke, carbon black, graphite and combinations of them, having a volume median particle diameter (D50) comprised between 0.5 μm and 35 μm, preferably between 0.8 μm and 20 μm, more preferably between 1 μm and 10 μm, as obtained from laser light scattering measurements according to ISO 13320 using MEK as solvent for vinyl aromatic polymers;
per 100 parts of vinyl aromatic polymer;
  the halogenated flame retardant is a halogenated block copolymer, characterized by a weight average molecular weight comprised between 20,000 and 300,000 g/mol, preferably between 30,000 and 200,000 g/mol, as determined by gel permeation chromatography against polystyrene standards and comprising:

from 20 to 60% by weight, preferably from 30 to 50% by weight of sequences (A) of polymerized monovinyl arenes and from 40 to 80% by weight, preferably from 50 to 70% by weight of sequences (B) of polymerized conjugated alkadienes or copolymerized conjugated alkadienes and monovinyl arenes; and from 20 to 80% by weight, preferably from 40 to 70% by weight of halogen substituents, preferably bromine;

the bromine derivative capture agent comprises zinc modified hydrotalcite of the formula:

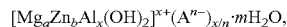

$[Mg_aZn_bAl_x(OH)_2]^{x+}(A^{n-})_{x/n} \cdot mH_2O$, wherein:
 $0.5 \leq a+b < 1.0$;
 $0 < x \leq 0.5$ and
 $a+b = 1-x$;
 m is a positive number,
 and A is an n-valent anion.

100 parts of one or more bromine derivative capture agents comprises at least 50 parts by weight of hydrotalcite of the formula:

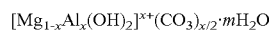

$[Mg_{1-x}Al_x(OH)_2]^{x+}(CO_3)_{x/2} \cdot mH_2O$ wherein:
 $0 < x \leq 0.5$, and m is a positive number.

DETAILED DESCRIPTION OF THE INVENTION

The present invention provides a process for the production of vinyl aromatic homo- and copolymers, characterized by Weight Average Molecular Weight (Mw) of at least 100,000 g/mol, said process comprising the polymerization of a mixture comprising from 50 to 99% by weight of ethylenically unsaturated monomers, comprising vinyl aromatic monomer, and from 1 to 50% by weight of PCR/PIR-PS, said PCR/PIR-PS comprising halogenated flame retardant, said polymerization being performed in the presence of one or more halogen derivative capture agent(s).

The process comprises a continuous free-radical mass polymerization (thermally initiated or initiated through initiator decomposition), of vinyl aromatic monomers, optionally in the presence of a nitrile and/or an ester of acrylic or methacrylic acid and/or a diene, said monomers solubilizing PCR/PIR-PC, said process comprising a one- or multi-stage continuous polymerization and a final working up, which comprises subjecting the polymerizing mixture to a vacuum devolatizing step.

The vinyl aromatic monomers are selected from the group consisting of styrene, alpha-methylstyrene, styrenes carrying alkyl substituents in the benzene nucleus, for example o-, m-, and p-vinyl-toluene, o-, m-, and p-ethylvinylbenzene, the various isomeric of vinyl-xylenes and mixtures thereof.

The vinyl aromatic monomers are preferably styrene and alpha-methyl styrene.

The PCR/PIR-PS preferably is selected from the group consisting of glass-clear polystyrene (GPPS), impact-resistant polystyrene (HIPS), anionically polymerized polystyrene or impact-resistant polystyrene (AIPS), styrene-alpha-methylstyrene copolymers, acrylonitrile-butadiene-styrene polymers (ABS), styrene-acrylonitrile polymer (SAN), acrylonitrile-styrene-acrylate (ASA), styrene acrylates, such as styrene-methyl acrylate (SMA) and styrene-methyl methacrylate (SMMA), methyl methacrylate-butadiene-styrene (MBS), methyl methacrylate-acrylonitrile-butadiene-styrene (MABS) polymers, styrene-N-phenylmaleimide copolymers (SPMI) or a mixture thereof, or a mixture of the above-mentioned styrene polymers with polyolefins, such as polyethylene or polypropylene, polyphenylene ether (PPE), and mixtures thereof.

The PCR/PIR-PS comprising the abovementioned vinyl aromatic (co)polymers, additionally may comprise up to 30% by weight of thermoplastic polymers such as polyamides (PA), polyolefins, e.g. polypropylene (PP) or polyethylene (PE), polyacrylates, e.g. polymethyl methacrylate (PMMA), polycarbonate (PC), polyesters, e.g. polyethylene terephthalate (PET) or polybutylene terephthalate (PBT), polyether sulfones (PES), polyether ketones, or polyether sulfides (PES), hydrophobically modified or functionalized polymers or oligomers, rubbers, e.g. polyacrylates or polydienes, for example styrene-butadiene block copolymers, or biodegradable aliphatic or aliphatic/aromatic copolyesters or a mixture thereof.

The PCR-PS is for example obtained from automotive parts, heating components, ventilation components, air-conditioning components, refrigeration components, construction components, insulation components, pharmaceutical and medical applications, consumer products, appliance packaging, food packaging, horticulture applications, seating parts, disposable eating and drink utensils and mixtures thereof; the PIR-PS is for example obtained from customer returns, from waste material from the production process, not suitable for being used in the consumer market, such as out of specs products, and mixtures thereof.

Since a multiple of end-applications of vinyl aromatic (co)polymers requires flame retardancy, at least part of the PCR/PIR-PS comprises flame retardants and flame retardant synergists.

The flame retardants generally are halogenated flame retardants, in particular brominated flame retardants.

Specific examples of bromine-containing flame retardant include hexabromocyclododecane, tris(2,3-dibromopropyl) isocyanurate, tetrabromobisphenol S-bis(2,3-dibromopropyl ether), tetrabromobisphenol F-bis(2,3-dibromopropyl ether), tetrabromobisphenol A, tetrabromobisphenol A-bis(2,3-dibromopropyl ether), tetrabromobisphenol A-bis(2,3-dibromo-2-methylpropyl ether), hexabromobenzene, pentabromotoluene, polybromodiphenyl ether, polybromodiphenylethane, bispolybromophenoxyethane, tris(tribromophenoxy)triazine, polybromophenylindan, polypentabromobenzyl acrylate, ethylenebistetrabromophthalimide, tris(tribromoneopentyl) phosphate, brominated epoxy resin oligomers, brominated polymers, in particular brominated block copolymers, and mixtures of two or more bromine-containing flame retardants.

Specific examples of flame retardant synergists are the thermal free-radical generators of the type comprising a C—C or C—O—O—C or S—S thermo-labile bond including cumene peroxide, cumene hydroperoxide, di-tert-butyl peroxide, di-tert-hexylperoxide, 2,5-dimethyl-2,5-di(tert-butylperoxy)hexyne-3, dicumyl peroxide, and 2,3-dimethyl-2,3-diphenylbutane.

Additionally PCR/PIR-PS may comprise stabilizers, blowing agents, cell regulators, nucleating agents, coke, carbon black, graphite, fillers, UV stabilizers, chain transfer agents, plasticizers, antioxidants and soluble and insoluble inorganic and/or organic dyes and pigments.

In general PCR/PIR-PS comprises between 100 and 40,000 ppm of bromine and between 50 and 25,000 ppm of flame retardant synergist.

It now has been observed that the presence of brominated flame retardants and synergists in PCR/PIR-PS gives rise to depolymerization in a subsequent polymerization process and a degradation of the derived vinyl aromatic (co)polymer.

Brominated flame retardants and derivatives therefor prevent the formation of vinyl aromatic (co)polymers with a weight average molecular weight of 100,000 g/mol and higher, which considerably limits the range of end-applications.

It now has been surprisingly found that the addition of a bromine derivative capture agent in the production process, enables the synthesis of vinyl aromatic (co)polymers with a Mw of 100,000 g/mol or higher, said Mw being preserved after a stability test of at least 30 minutes at 230° C.

The introduction of heat stabilizers in melt processing operations for the production of extruded and expandable polystyrene, is for example disclosed E 2 379 628, EP 2 998 347, EP 3 301 134 and EP 2 921 520, yet there is complete lack of teaching on the potential stabilization of a mixture of monomers, comprising vinyl aromatic monomers, halogenated flame retardants and synergists during the polymerization of said monomers.

The bromine derivative capture agent usable in the process of the present invention is selected from the group consisting of metal salts of longer chain carboxylic acids, layered double hydroxides, metal-doped layered double hydroxides, metal oxides, metal hydroxides, metal carbonates, metal lactates, the metal salts of a phosphoric or phosphonic acid and mixtures thereof and is added in an amount of from 0.01 to 7% by weight, preferably of from 0.01 to 6% by weight, more preferably of from 0.01 to 5% by weight, relative to the total amount of vinyl aromatic monomer and PCR/PIR-PS.

Preferably the bromine derivative capture agent is a layered double hydroxide of the formula:

$$[M^{II}_{1-x}M^{III}_{x}(OH)_2]^{x+}(A^{n-})_{x/n} \cdot yH_2O$$

wherein:
$M^{II}$ is a divalent metal ion selected from the group consisting of $Mg^{2+}$, $Ca^{2+}$, $Mn^{2+}$, $Fe^{2+}$, $Zn^{2+}$, $Cu^{2+}$, $Ni^{2+}$ and $Co^{2+}$;
$M^{III}$ is a trivalent metal ion selected from the group consisting of $Al^{3+}$, $Cr^{3+}$, $Fe^{3+}$, $Ga^{3+}$, and $Mn^{3+}$;
$A^{n-}$ is an anion selected from the group consisting of $Cl^-$, $CO_3^{2-}$, $NO_3^-$, $SO_4^{2-}$, alkyl sulfonates, alkyl aryl sulfonates, organic phosphates, organic carboxylates and mixtures thereof; and $0.25 \le y \le 4$;

$0.1 \le x \le 0.5$.

More preferably the layered double hydroxide is a hydrotalcite compound of the formula:

$$[Mg_{1-x}Al_x(OH)_2]^{x+}(CO_3)_{x/2} \cdot mH_2O$$

wherein:
$0 < x \le 0.5$, and m is a positive number,
Optionally the layered double hydroxide is metal-doped, such as for example is the case for zinc doped hydrotalcite of the formula:

$$[Mg_aZn_bAl_x(OH)_2]^{x+}(A^{n-})_{x/n} \cdot mH_2O,$$

wherein:
$0.5 \le a+b < 1.0$;
$0 < x \le 0.5$ and
$a+b = 1-x$; and
$a \ge b > 0.03\,a$; preferably $a \ge b > 0.3\,a$;
m is a positive number, and
A is an n-valent anion.
the anion is carbonate ion $CO_3^{2-}$.

It has been found that the addition of bromine derivative capture agent at any stage of the polymerization and/or before the devolatilization step enables the synthesis of vinyl aromatic (co)polymers with a Mw comprised between 100,000 and 400,000 g/mol, preferably between 125,000 and 300,000 g/mol, more preferably 30 between 150,000 and 250,000 g/mol, said bromine derivative capture agent preferably comprising from 50 to 100% by weight of hydrotalcite and from 0 to 50% by weight of zinc-doped hydrotalcite. 100 parts of one or more bromine derivative capture agents comprises at least 50 parts by weight of hydrotalcite of the formula:

$$[Mg_{1-x}Al_x(OH)_2]^{x+}(CO_3)_{x/2} \cdot mH_2O$$

wherein:
$0 < x \le 0.5$, and m is a positive number,
More preferably the bromine derivative capture agent is 100% hydrotalcite.

The inventors have found that for a 50/50 mixture, preferably a 60/40 mixture, more preferably a 70/30 mixture, most preferably a 80/20 mixture of vinyl aromatic monomer/(PCR/PIR-PS), wherein the PCR/PIR-PS comprises up to 6% by weight, preferably up to 5% by weight, more preferably up to 4% by weight, most preferably up to 3% by weight of halogenated flame retardant and up to 3% by weight, preferably up to 2.5% by weight, more preferably up to 2% by weight of flame retardant synergist, the addition of hydrotalcite, in such an amount that the weight ratio of hydrotalcite over bromine of the flame retardant of PCR/PIR-PS is 4 or less, preferably 3 or less, enables an identical synthesis progress and end-product specifications as observed for a continuous free-radical mass polymerization of an identical vinyl aromatic monomer composition, but not comprising PCR/PIR-PS.

The synthesis of vinyl aromatic (co)polymer, with M of 100.000 g/mol or higher from vinyl aromatic monomer(s) and PCR/PIR-PS is carried out in a multiple series-connected stirred vessels with continuous flow at a temperature of from 110 up to 200° C.

First of all x parts of PCR/PIR-PS are dissolved in 100−x parts of ethylenically unsaturated monomer, comprising vinyl aromatic monomer(s), in a stirred solution tank.

The solution comprising vinyl aromatic monomer and PCR/PIR-PS is transferred to a holding tank over a filter system with a mesh size comprised between 10 and 1000, preferably comprised between 10 and 700, more preferably comprised between 10 and 500, most preferably between 10 and 300 or even comprised between 10 and 100.

Optionally one or more chain transfer agents are added to the solution in an amount of from 10 to 200 ppm.

The filtered solution, in the holding tank, is transferred to a first polymerization reactor, standing at a temperature comprised between 115° C. and 150° C., preferably between 125° C. and 140° C., where a polymerization to a monomer conversion comprised between 20 and 50%, preferably between 25 and 40% is carried out.

The polymerized vinyl aromatic (co)polymer is transferred to a second polymerization reactor, standing at a temperature comprised between 130° C. and 170° C., preferably between 140° C. and 160° C., where a polymerization to a monomer conversion degree comprised between 60 and 75%, preferably between 65 and 72% is carried out.

The vinyl aromatic (co)polymer is optionally transferred to a plug flow reactor where further polymerization to a monomer conversion of up to 90% is carried out at a temperature comprised between 160° C. and 190° C., preferable between 170° C. and 185° C.

The vinyl aromatic (co)polymer, comprising unreacted monomers, oligomers and other volatile components is transferred to one or more degassing vessels where degassing is carried out at a temperature comprised between 210 and 255° C., preferable 220 and 245° C., at a pressure comprised between 1 and 50 mbar abs., preferably between 2 and 35 mbar abs.

Bromine derivative capture agent is added in an amount of from 0.01 to 6 parts, preferably of from 0.01 to 4 parts, more preferably of from 0.01 to 2 parts for 100 parts of (co)polymer, PCR/PIR-PS, oligomers and/or monomers, at any stage of the process, i.e

- before, during or after a monomer conversion comprised between 20 and 50%, preferably between 25 and 40%; and/or
- during or after a monomer conversion comprised between 60 and 75%, preferably between 65 and 72%; and/or
- during a monomer conversion of up to 90%; and/or
- before the devolatilization step, preferably before the preheater of the one or more degassing vessels.

Preferably the bromine derivative capture agent is added before the devolatilization step, more preferably before the preheater of the one or more degassing vessels.

The vinyl aromatic (co)polymer thus obtained is characterized by a Mw comprised between 100.000 and 400.000 g/mol, the molecular weight remaining unchanged after a stability test at 230° C. for 30 minutes, preferably at 220° C. for 1 hour.

The vinyl aromatic (co)polymer obtained accordingly the process of the present invention can be converted into expandable and extruded expanded vinyl aromatic polymer compositions or can be converted into extruded sheets, or can be injection moulded.

In a particular embodiment of the present invention, the vinyl aromatic (co)polymers obtained accordingly the polymerization process of the present invention are used for the production of expandable vinyl aromatic (co)polymers (EPS), more particular expandable vinyl aromatic (co)polymers enabling the production of expanded beads allowing molded parts such as insulation panels with an improved fire resistance and a reduced thermal conductivity, said expandable vinyl aromatic (co)polymers comprising:

- from 0.5 to 15, preferably from 1 to 10 parts by weight of dispersed athermanous particles selected from the group consisting of coke, carbon black, graphite and combinations of them, having a volume median particle diameter (D50) comprised between 0.5 and 35 µm, preferably between 0.8 and 20 µm, more preferably between 1 and 10 µm, as obtained from laser light scattering measurements according to ISO 13320 using MEK as solvent for vinyl aromatic polymers;
- from 2 to 10 parts by weight, preferably from 3 to 7 parts by weight of blowing agent;
- from 0.2 to 5 parts by weight, preferably from 0.3 to 4 parts by weight, more preferably from 0.4 to 3 parts by weight of a halogenated flame retardant; and
- from 0.02 to 5 parts by weight, preferably from 0.025 to 4 parts by weight of one or more bromine derivative capture agents;

per 100 parts of vinyl aromatic polymer.

Suitable blowing agents are the physical blowing agents usually used in expandable styrene polymers e.g. aliphatic hydrocarbons having from 2 to 7 carbon atoms, alcohols, ketones, ethers, or halogenated hydrocarbons. Preferred blowing agents are isobutane, n-butane, isopentane, or n-pentane.

Suitable halogenated flame retardants are tetrabromobisphenol A-bis(2,3-dibromopropyl ether), tetrabromobisphenol A-bis(2,3-dibromo-2-methylpropyl ether) or brominated polymers, preferably brominated block copolymers containing at least 35% by weight of bromine, such as described in for example WO 2008/021417, WO 2010/114637, WO 2009/134628, WO 2008/021418 and WO 2008/021418.

The bromine derivative capture agent may be any of those known in the art, but preferably comprises at least 50% by weight of zinc modified hydrotalcite of the formula:

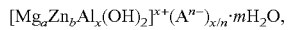

wherein:
0.5≤a+b<1.0;
0<x≤0.5 and
a+b=1−x;
m is a positive number.
100 parts of one or more bromine derivative capture agents comprises at least 50 parts by weight of hydrotalcite of the formula:

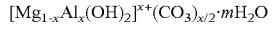

wherein:
0<x≤0.5, and m is a positive number.

The zinc-modified hydrotalcite is preferably treated with a surface treatment agent for enabling its uniform dispersion in a vinyl aromatic polymer composition.

The expandable vinyl aromatic (co)polymer composition additionally comprises flame retardant synergists, examples being the thermal free-radical generators of the type comprising a C—C or C—O—O—C or S—S thermo-labile bond; cell regulators such as for example talc and polyethylene wax and further may comprise the usual and known auxiliaries and additives, examples being, fillers, UV stabilizers, chain-transfer agents, plasticizers, antioxidants, soluble and insoluble inorganic and/or organic dyes and pigments.

Various processes can be used to produce the particularly preferred expandable vinyl aromatic polymers.

Particular preference is given to a process comprising the steps of:
a) producing a polymer melt stream after the polymerization process according to the present invention;
b) deriving a part of said polymer melt stream and creating a first polymer melt stream 1 and a second polymer melt stream 2;
c) using an extruder for incorporating the comminuted athermanous particles and the foam cell regulator into the second polymer melt stream 2 at a temperature of at least 160° C., preferably comprised between 180° C. and 250° C., more preferably between 200° C. and 240° C., most preferably between 210° C. and 230° C.;
d) introducing blowing agent into the first polymer melt stream 1;
e) merging the first (1) and the second (2) polymer melt streams, forming a new joint polymer melt stream;
f) cooling the new joint polymer melt to a temperature of 200° C. or less, preferably a temperature comprised between 120° C. and 200° C.;
g) introducing the flame-retardant agent, synergist and heat stabilizer, in particular zinc-modified hydrotalcite, preferably in combination with antioxidant, into the new joint polymer melt stream;
h) discharging through a die plate with holes, the diameter of which at the exit from the die is comprised between 0.3 and 1.5 mm, preferably between 0.5 and 1.0 mm;

i) pelletizing the joint polymer melt stream directly downstream of the die plate under water into a water circuit under a pressure above 3 bar, preferably above 5 bar.

The expandable pellets (beads, granules) can then further be coated and processed to give expanded vinyl aromatic polymer foams, in particular polystyrene foams.

In a first step, the expandable vinyl aromatic polymer pellets of the invention can be prefoamed by using hot air or steam, in what are known as prefoamers, to give foam beads of density in the range from 20 to 100 kg/m³, in particular from 15 to 50 kg/m³, the final foaming step focusing a density preferably from 10 to 35 kg/m³. Eventually in order to reach the lower densities a second foaming step can be applied. After maturation, in a next step the foamed beads (to which a coating has been applied) are placed in molds where they are treated with steam and where they are further expanded and fused to give molded foams.

The molded foam is characterized by a thermal conductivity, in accordance to DIN 52612, of less than 36 mW/m·K for a foam density of 16 kg/m³ or lower, even of less than 34 mW/m·K for a foam density of 20 kg/m³ or lower, even of less than 31 mW/m·K for a foam density of 25 kg/m³ or lower.

The foam panels derived from the expandable vinyl aromatic polymers according to the present invention all have B2 rating (DIN 4102-1) and the average flame height, according to DIN 4102-1, below 10 cm and the single burning item (SBI) test according EN 13823 and classified according to EN 13501-1 at 20 kg/m³ density and 6 cm thickness of class B.

In a another particular embodiment of the present invention, the vinyl aromatic (co)polymers obtained accordingly the polymerization process of the present invention are used for the production of extruded expanded vinyl aromatic (co)polymer compositions (XPS), said compositions comprising:

from 2 to 10 parts by weight, preferably from 3 to 7 parts by weight of blowing agent;

from 0.2 to 8 parts by weight, preferably from 0.3 to 6 parts by weight, more preferably from 0.4 to 3 parts by weight of a halogenated flame retardant; and from 0.02 to 5 parts by weight, preferably from 0.025 to 4 parts by weight of one or more bromine derivative capture agents;

per 100 parts of vinyl aromatic (co)polymer.

When reduced thermal conductivity is required the extruded vinyl aromatic (co)polymer compositions additionally comprise from 0.5 to 15, preferably from 1 to 10 parts by weight, per 100 parts by weight of vinyl aromatic (co)polymer, of dispersed athermanous particles selected from the group consisting of coke, carbon black, graphite and combinations of them, having a volume median particle diameter (D50) comprised between 0.5 μm and 35 μm, preferably between 0.8 μm and 20 μm, more preferably between 1 μm and 10 μm, as obtained from laser light scattering measurements according to ISO 13320 using MEK as solvent for vinyl aromatic polymers.

Suitable blowing agents are physical blowing agents, usually used in extruded expanded styrene (co)polymer compositions, such as alcohols, ethers, halogenated hydrocarbons, hydrocarbons, such as butane, pentane, hexane, cyclopentane, $CO_2$ and water.

Suitable halogenated flame retardants are tetrabromobisphenol A-bis(2,3-dibromopropyl ether), tetrabromobisphenol A-bis(2,3-dibromo-2-methylpropyl ether) or brominated polymers, preferably brominated block copolymers containing at least 35% by weight of bromine.

The bromine derivative capture agent may be any of those known in the art, but preferably comprises at least 50% by weight of zinc modified hydrotalcite of the formula:

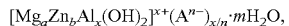

wherein:
$0.5 \leq a+b < 1.0$;
$0 < x \leq 0.5$ and
$a+b=1-x$;
m is a positive number.

100 parts of one or more bromine derivative capture agents comprises at least 50 parts by weight of hydrotalcite of the formula:

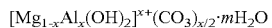

wherein:
$0 < x \leq 0.5$, and m is a positive number.

The zinc-modified hydrotalcite is preferably treated with a surface treatment agent for enabling its uniform dispersion in a vinyl aromatic polymer composition.

The extruded expanded vinyl aromatic (co)polymer composition additionally comprises flame retardant synergists, examples being the thermal free-radical generators of the type comprising a C—C or C—O—O—C or S—S thermolabile bond; cell regulators such as for example talc and polyethylene wax and further may comprise the usual and known auxiliaries and additives, examples being, fillers, UV stabilizers, chain-transfer agents, plasticizers, antioxidants, soluble and insoluble inorganic and/or organic dyes and pigments.

Various processes can be used to produce the extruded expanded vinyl aromatic (co)polymer compositions.

Particular preference is given to a process comprising the steps of:

a) producing a polymer melt stream after the polymerization process according to the present invention;

b) using a multi-zone screw-type extruder for incorporating and blending, in a first zone, foam cell regulator, flame retardant, bromine derivative capture agent, preferably zinc-modified hydrotalcite, preferably in combination with antioxidant, and optionally comminuted athermanous particles and gradually increasing the temperature to at least 160° C., preferably to a temperature comprised between 160° C. and 220° C., more preferably between 170° C. and 210° C.;

c) introducing blowing agent into a subsequent second zone while maintaining the extrusion temperature comprised between 160° C. and 220° C., more preferably between 170° C. and 210° C.;

d) transferring the expandable mix into a cooling screw-type extruder for gradually cooling from a temperature comprised between 160° C. and 220° C., more preferably between 170° C. and 210° C. to a barrel temperature comprised between 80° C. and 100° C.;

e) extruding and foaming the foamable molten product by extruding the foamable molten product into a low pressure zone through a die slit section of an extruder, the die slit section having an opening to form a plate-shaped foam having a density of from 20 kg/m³ to 45 kg/m³.

EXAMPLES

Example 1: Production of Polystyrene Comprising PCR/PIR-PS

PCR/PIR-PS was dissolved in styrene and ethylbenzene (EB) with following ratios: 25% PCR/PIR-PS, 5% EB and 70% styrene.

After a residence time of 2 hrs in the solution tank, the solution was transferred over a filter system with a 100 mesh size to a holding tank where 400 ppm of hydrotalcite (DHT-4A from Kisuma Chem. Ind.) were added.

A sample from the holding tank revealed the presence of 140 ppm bromine.

From the holding tank the solution was continuously withdrawn and fed to a stirred first reactor, provided with turbine stirrer and jacket heating, at a constant throughput of 5 kg per hour. With a mean residence time of 2 hour, an internal temperature of 135° C. and a number of rotations of the helical stirrer of 50 rpm, a monomer conversion of 35% was obtained.

The prepolymer/oligomer/monomer mixture was continually fed to a stirred second reactor, provided with helical stirrer and jacket heating. With a mean residence time of 3 hours, an internal temperature of 150° C. and a number of rotations of the helical stirrer of 20 rpm, a monomer conversion of 65% was obtained.

The polymer was continuously transferred to two devolatizing vessels in series where ethylbenzene, residual styrene, styrene oligomers and other volatile compounds were removed after an overall residence time of 30 minutes at a temperature of 215° C. and an pressure of 30 mbar absolute Polystyrene characterized by a weight average molecular weight (Mw) of 200,000 g/mol was obtained, said Mw remaining unchanged after a stability test of 1 hr at 220° C.

Example 2: Production of Flame Retardant Expandable Polystyrene

An expandable vinyl aromatic (co)polymer composition was prepared according to the process described above (paragraph 65), wherein to 100 parts of the polystyrene of Example 1 were added 6% by weight of needle coke (Asbury 4727), 0.15% by weight of high density polyethylene wax with a weight average molecular weight (Mw) of 2 kDa, 1.0% by weight of Emerald Innovation™ 3000 (Chemtura), 0.33% by weight, of 2,3-dimethyl-2,3-diphenylbutane (Curox® CC-DC from United Initiators)(synergist), and 0.125% of heat stabilizer, said heat stabilizer comprising 25 parts by weight of Ultranox® 626, an organophosphate supplied by Addivant, 25 parts of Anox® 20, a hindered phenolic supplied by Addivant and 50 parts of $Mg_3ZnAl_2(OH)_{12}CO_3 \cdot mH_2O$ (ZHT-4V from Kisuma Chem. Ind.)

The foam panel had B2 rating (DIN 4102) and a thermal conductivity (A, in mW/m·K), determined in accordance to ISO 8301 of 30.3 for a foam density of 20.5 kg/m³.

Example 3: Production of Flame Retardant Extruded Expanded Polystyrene

An extruded expanded vinyl aromatic (co)polymer composition was prepared according to the process described above (paragraph 78), wherein to 100 parts of the polystyrene of Example 1 were added 2 parts of a flame retardant masterbatch comprising 45% of Emerald Innovation™ 3000 (Chemtura), 0.5 parts of a nucleating masterbatch comprising 50% of talc and 1.8 parts of $Mg_3ZnAl_2(OH)_{12}CO_3 \cdot mH_2O$ (ZHT-4V from Kisuma Chem. Ind.). The mixture was molten in the first zone of a double screw extruder in order to obtain a temperature of about 200° C. In the next zone, 5 parts of a mix of expanding agents (40% of $CO_2$, 50% of dimethyl ether and 10% of butane) were injected and mixed at about 200° C. The thus obtained expandable mix was brought into the cooling extruder where the barrel temperatures were regulated as to obtain a smooth cooling from about 200° C. to 90° C. (barrel temperature). The thus obtained mix was extruded through a die in order to obtain sheet after stabilization of 80 mm thickness.

After one week of stabilization and degassing the foam was characterized by a thermal conductivity, in accordance to DIN 52612, of less than 30 mW/m·K for a foam density of 35 kg/m³.

The foam panel had B2 rating (DIN 4102-1) and the average flame height, according to DIN 4102-1, below 10 cm and the single burning item (SBI) test according EN 13823 and classified according to EN 13501-1 at 35 kg/m³ density and 80 mm thickness of class E.

The invention claimed is:

1. A process for the production of a vinyl aromatic (co) polymer comprising:
    a) mixing
        a fraction (A) comprising one or more monomers selected from the group consisting of styrene, alpha-methyl styrene, acrylonitrile, methyl (meth)acrylate, (meth)acrylic acid and butadiene with
        a fraction (B) comprising recycled vinyl aromatic (co) polymer comprising post-consumer recycled polystyrene (PCR-PS) and/or post-industrial recycled polystyrene (PIR-PS) comprising halogenated flame retardant, wherein the recycled vinyl aromatic (co) polymer of fraction (B) is characterized by a weight average molecular weight comprised between 100,000 and 400.00 g/mol, wherein fraction (B) comprises bromine containing flame retardant and flame-retardant synergists, and wherein the weight ratio of fraction (B) to fraction (A) is comprised between 0.01/1 and 1/1;
    b) subjecting the resulting mixture to a free-radical polymerization, and polymerizing to a monomer conversion of up to 90%, to obtain a polymerized mixture comprising vinyl aromatic (co) polymer;
    c) vacuum devolatizing the polymerized mixture and recovering vinyl aromatic (co) polymer characterized by a weight average molecular weight comprised between 100,000 and 400,000 g/mol;
    wherein one or more bromine derivative capture agents are added in an amount of from 0.01 to 6 parts for 100 parts of (co) polymer, PCR/PIR-PC, oligomers and/or monomers before and/or during and/or after at least one of the steps a) to b) and before the devolatizing step c); and
    wherein 100 parts of one or more bromine derivative capture agents comprises at least 50 parts by weight of hydrotalcite of the formula:

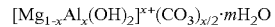

wherein:
    $0 < x \leq 0.5$, and m is a positive number.

2. The process according to claim 1 comprising the additional step of filtering the mixture of step a) over a filter with a mesh size comprised between 10 and 1000, before initiating step b).

3. The process according to claim 1 wherein fraction (B) comprises between 100 and 40,000 ppm of bromine.

4. The process according to claim 1 wherein the one or more bromine derivative capture agents are added in such an amount that the weight ratio of bromine derivative capture agent over bromine of the bromine containing flame retardant of fraction (B) is 4 or less.

5. The process according to claim 1 wherein the polymerization in step b) is performed in a continuous multi reactor process, starting at a temperature comprised between 115° C. and 150° C. and stepwise increasing to a temperature comprised between 145° C. and 190° C.

6. The process according to claim 1 wherein vacuum devolatilizing of step c) is performed at a temperature comprised between 210° C. and 255° C. and a pressure comprised between 1 and 50 mbar·abs.

* * * * *